United States Patent
Lapomardo et al.

(10) Patent No.: US 9,852,094 B2
(45) Date of Patent: Dec. 26, 2017

(54) DEVICE CONFIGURATION USING A MAGNETIC FIELD

(71) Applicant: Allegro Microsystems, LLC, Worcester, MA (US)

(72) Inventors: Jesse Lapomardo, Pembroke, NH (US); Craig S. Petrie, Merrimack, NH (US); Matthew Regan, Medford, MA (US); Michael C. Doogue, Bedford, NH (US)

(73) Assignee: Allegro MicroSystems, LLC, Worcester, MA (US)

( * ) Notice: Subject to any disclaimer, the term of this patent is extended or adjusted under 35 U.S.C. 154(b) by 251 days.

(21) Appl. No.: 14/960,654

(22) Filed: Dec. 7, 2015

(65) Prior Publication Data

US 2017/0161218 A1   Jun. 8, 2017

(51) Int. Cl.
*G06F 13/10* (2006.01)
*G06F 13/36* (2006.01)
*G06F 13/42* (2006.01)
*G06F 13/40* (2006.01)

(52) U.S. Cl.
CPC .......... *G06F 13/36* (2013.01); *G06F 13/4068* (2013.01); *G06F 13/4282* (2013.01)

(58) Field of Classification Search
None
See application file for complete search history.

(56) References Cited

U.S. PATENT DOCUMENTS

| 8,577,634 | B2 | 11/2013 | Donovan et al. | |
| 8,874,818 | B2 * | 10/2014 | Felth | G05B 9/02 340/5.64 |
| 8,947,914 | B2 * | 2/2015 | Park | G11C 11/16 365/148 |
| 9,035,872 | B2 * | 5/2015 | Brown | G06F 3/01 345/156 |
| 9,316,702 | B2 * | 4/2016 | Komatsu | G01R 33/0023 |
| 9,647,032 | B2 * | 5/2017 | Wang | H01L 27/228 |

(Continued)

FOREIGN PATENT DOCUMENTS

| DE | 10 2009 007 109 | 8/2010 |
| WO | WO 02/09338 60 | 1/2002 |

OTHER PUBLICATIONS

Extended European Search Report dated May 11, 2017 for European Application No. 16201900.4, 5 pages.

(Continued)

*Primary Examiner* — Cheng-Yuan Tseng
(74) *Attorney, Agent, or Firm* — Daly, Crowley, Mofford & Durkee, LLP (57) ABSTRACT

Described embodiments provide a device configured to be coupled to a shared bus. The device includes a magnetic field sensing element to sense a magnetic field. Upon receiving a configuration command over the shared bus, the device determines whether a parameter of the sensed magnetic field meets a predetermined criteria. If the parameter of the sensed magnetic field meets the predetermined criteria, the device responds to the configuration command by applying one or more configuration settings. Otherwise, if the parameter of the sensed magnetic field does not meet the predetermined criteria, the device ignores the configuration command.

36 Claims, 3 Drawing Sheets

(56) References Cited

U.S. PATENT DOCUMENTS

| | | |
|---|---|---|
| 2012/0249126 A1 | 10/2012 | Friedrich et al. |
| 2012/0309354 A1* | 12/2012 | Du .................. H04W 12/02 455/411 |
| 2016/0018479 A1* | 1/2016 | Cambou ............ G11C 11/1659 324/252 |
| 2016/0259372 A2* | 9/2016 | Risher-Kelly ........ G06F 1/1632 |
| 2017/0178705 A1* | 6/2017 | Buhrman .............. G11C 11/161 |
| 2017/0214532 A1* | 7/2017 | Das ...................... H04L 9/3278 |

OTHER PUBLICATIONS

"I²C-bus specification and user manual" by NXP Semiconductors N.V., Rev. 6-4, dated Apr. 2014, 64 page.
"LIN Specification Package" by LIN Consortium, Revision 2.2A dated Dec. 31, 2010; 194 pages.

\* cited by examiner

DEVICE CONFIGURATION USING A MAGNETIC FIELD

CROSS-REFERENCE TO RELATED APPLICATIONS

NONE

STATEMENT REGARDING FEDERALLY SPONSORED RESEARCH OR DEVELOPMENT

NONE

FIELD OF THE INVENTION

Embodiments of the present invention relate to configuration of devices coupled to a shared communications bus.

BACKGROUND

In vehicle systems, numerous sensors are employed to monitor operating parameters such as current, speed, angle, linear position, and rotational direction of an article associated with a control module, such as a power steering module, a fuel injection module, an anti-lock brake module, etc, The sensor output signals are provided over a communications bus to a system controller, such as an Electronic/Engine Control Unit (ECU) or Engine Control Module (ECM), which processes data provided by the various sensors. Vehicle systems commonly employ serial communication buses that are coupled to multiple sensors (and/or other devices) to communicate commands and data, In such shared bus networks, each device coupled to the bus is often assigned a unique address such that commands and data can be broadcast over the shared bus, but only processed by one or more intended recipient devices independently from all the devices on the shared bus. Other shared bus implementations might not necessarily require a unique address, and instead include a select or enable signal for each device coupled to the shared bus.

For example, bus protocols commonly employed in automotive applications, such as the Inter-Integrated Circuit ("I²C") bus and the Local Interconnect Network ("LIN") bus, require that each device attached to the bus be identified by a unique address. Such buses might further specify other features also be assigned to each device, for example that devices coupled to the bus are operated as either a master device or a slave device. Other commonly used automotive bus protocols, such as the Serial Peripheral Interface ("SPI") bus include one or more select or enable signal lines to select and independently communicate with a specific device coupled to the bus. Such a select or enable signal requires the inclusion of extra wiring on the bus and the allocation of additional controller input port(s) on devices coupled to the shared bus, thus increasing the cost and complexity of the bus and related devices.

For bus protocols that employ device addressing, several manners of assigning addresses to devices are possible. Some mechanisms allow setting device addresses by device users after the time of device manufacture. For example, employing switches (e.g., a dual inline package or "DIP" switch), a jumper block connector or other similar devices would allow a user to set signal values to a controller of each device, and thus set the device address. Such mechanisms require additional components, which can increase cost. Further, at least some probability of user error is introduced that could prevent proper operation. Alternatively, a user might be able to program an address of a device, for example by downloading software to a controller of the device (e.g., "flashing" the device) that then programs the device address. Such in-circuit programming typically might require more complex and more expensive controllers and related components and increase software complexity.

Other mechanisms set device addresses at the time of device manufacture. For example, some systems might program each device with a unique address value in read-only memory (ROM) or one-time programmable (OTP) memory that might be used as the device address. Alternatively, signal values to a controller of a device might be set (or "hard-wired") during manufacture by placing (or not placing) circuit components on the circuit board (e.g., to set a resistor divider value, place jumpers, etc,), cutting circuit board traces or wiring to the controller, or other similar means. However, such mechanisms increase manufacturing complexity and might require additional physical circuit board space.

Therefore, an improved manner of configuring devices coupled to a shared bus, for example, assigning a unique device address, is envisioned.

SUMMARY

This Summary is provided to introduce a selection of concepts in a simplified form. that are further described below in the Detailed Description. This Summary is not intended to identify key features or essential features of the claimed subject matter, nor is it intended to be used to limit the scope of the claimed subject matter.

In one aspect, a device is configured to be coupled to a shared bus. The device includes a magnetic field sensing element to sense a magnetic field. Upon receiving a configuration command over the shared bus, the device determines whether a parameter of the sensed magnetic field meets a predetermined criteria. If the parameter of the sensed magnetic field meets the predetermined criteria, the device responds to the configuration command by applying one or more configuration settings. Otherwise, if the parameter of the sensed magnetic field does not meet the predetermined criteria, the device ignores the configuration command.

In an embodiment, the device receives the one or more configuration settings over the shared bus.

In an embodiment, a memory stores the one or more configuration settings.

In an embodiment, the magnetic field is applied by a magnet.

In an embodiment, the device includes a plurality of separately addressable sub modules, and wherein the controller is configured to independently apply configuration settings to each of the plurality of separately addressable sub-modules.

In an embodiment, the device is an integrated circuit, and each of the separately addressable sub-modules is a silicon die.

In an embodiment, the device is a magnetic field sensor integrated circuit.

In an embodiment, the magnetic field sensing element is at least one of a Hall effect element, a magnetoresistance element, and a magnetotransistor.

In an embodiment, the parameter of the sensed magnetic field is at least one of a magnetic field magnitude, a magnetic field polarity, and a magnetic field angle.

In an embodiment, the one or more configuration settings include a unique bus address.

In an embodiment, the device resets after applying the one or more configuration settings.

In an embodiment, the shared bus is one of an Inter-Integrated Circuit (I2C) bus, a Serial Peripheral Interface (SFr) bus, a Single Edge Nibble Transmission (SENT) bus, a bus employing Manchester encoding, and a Local Interconnect Network (LIN) bus.

Another aspect provides a method of configuring each of a plurality of devices coupled to a shared bus. The method includes receiving a configuration command over the shared bus and determining, by a magnetic field sensing element of each of the plurality of devices, whether a parameter of a sensed magnetic field meets a predetermined criteria. For each of the plurality of devices having a parameter of the sensed magnetic field meeting the predetermined criteria, the device applies one or more configuration settings. For each of the plurality of devices that do not have a parameter of the sensed magnetic field that meets the predetermined criteria, the device ignores the command.

In an embodiment, each of the responding ones of the plurality of devices receive one or more configuration settings.

In an embodiment, the received one or more configuration settings are stored in a memory.

In an embodiment, before the step of determining, the method includes applying, by a magnet, a magnetic field to a given one of the plurality of devices.

In an embodiment, the method includes iteratively applying the magnetic field to each of the plurality of devices until each of the plurality of devices has been configured.

In an embodiment, one or more of the plurality of devices include a plurality of separately addressable sub-modules. The method includes iteratively resending the configuration command over the shared bus until each of the plurality of separately addressable sub-modules of each of the responding ones of the plurality of devices has been configured.

In an embodiment, each of the plurality of devices is an integrated circuit, and each of the separately addressable sub-modules is a silicon die.

In an embodiment, each of the plurality of devices is a magnetic field sensor integrated circuit.

In an embodiment, the magnetic field sensing element is at least one of a Hall effect element, a magnetoresistance element, and a magnetotransistor.

In an embodiment, the parameter of the sensed magnetic field is at least one of a magnetic field magnitude, a magnetic field polarity, and a magnetic field angle. The method includes comparing the sensed parameter to the predetermined criteria.

In an embodiment, the one or more configuration settings include a unique bus address.

In an embodiment, the method includes resetting given ones of the plurality of devices by at least one of sending a reset command over the shared bus to reset given ones of the plurality of devices and performing a power cycle to reset given ones of the plurality of devices.

In an embodiment, the shared bus is one of an Inter-Integrated Circuit (I2C) bus, a Serial Peripheral Interface (SPI) bus, a Single Edge Nibble Transmission (SENT) bus, a bus employing Manchester encoding, and a Local Interconnect Network (LIN) bus.

Yet another aspect provides a system including a master and a plurality of devices each coupled to a shared bus. The master sends a configuration command over the shared bus. Each of the plurality of devices determine whether a parameter of a sensed magnetic field meets predetermined criteria. Each of the plurality of devices having a parameter of the sensed magnetic field value meeting the predetermined criteria respond to the configuration command by applying one or more configuration settings. Each of the plurality of devices not having a parameter of the sensed magnetic field meeting the predetermined criteria ignore the configuration command.

In an embodiment, the master sends the one or more configuration settings over the shared bus.

In an embodiment, the magnetic field is applied to a given one of the plurality of devices by a magnet, and the magnetic field is iteratively applied to each of the plurality of devices until each of the plurality of devices has been configured.

In an embodiment, one or more of the plurality of devices include a plurality of separately addressable sub-modules, and the master iteratively resends the configuration command over the shared bus until each of the plurality of separately addressable sub-modules of each of the responding ones of the plurality of devices has been configured.

In an embodiment, each of the plurality of devices is an integrated circuit, and each of the separately addressable sub-modules is a silicon die.

In an embodiment, each of the plurality of devices is a magnetic field sensor integrated circuit.

In an embodiment, the magnetic field sensing element is at least one of a Hall effect element, a magnetoresistance element, and a magnetotransistor.

In an embodiment, the parameter of the sensed magnetic field is at least one of a magnetic field magnitude, a magnetic field polarity, and a magnetic field angle, and each of the plurality of devices compares the sensed parameter to the predetermined criteria.

In an embodiment, the one or more configuration settings include a unique bus address.

In an embodiment, the master resets given ones of the plurality of devices by at least one of sending a reset command over the shared bus to given ones of the plurality of devices, and power cycling given ones of the plurality of devices.

In an embodiment, the shared bus is one of an Inter-Integrated Circuit (I2C) bus, a Serial Peripheral Interface (SPI) bus, a Single Edge Nibble Transmission (SENT) bus, a bus employing Manchester encoding, and a Local. Interconnect Network (LIN) bus.

BRIEF DESCRIPTION OF THE DRAWING FIGURES

Aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Described embodiments provide a device configured to be coupled to a shared bus. The device includes a magnetic field sensing element to sense a magnetic field. Upon receiving a configuration command over the shared bus, the device determines whether a parameter of the sensed magnetic field meets predetermined criteria. If the parameter of the sensed magnetic field meets the predetermined criteria, the device responds to the configuration command by applying one or more configuration settings. Otherwise, if the parameter of the sensed magnetic field does not meet the predetermined criteria, the device ignores the configuration command.

Figure 1:
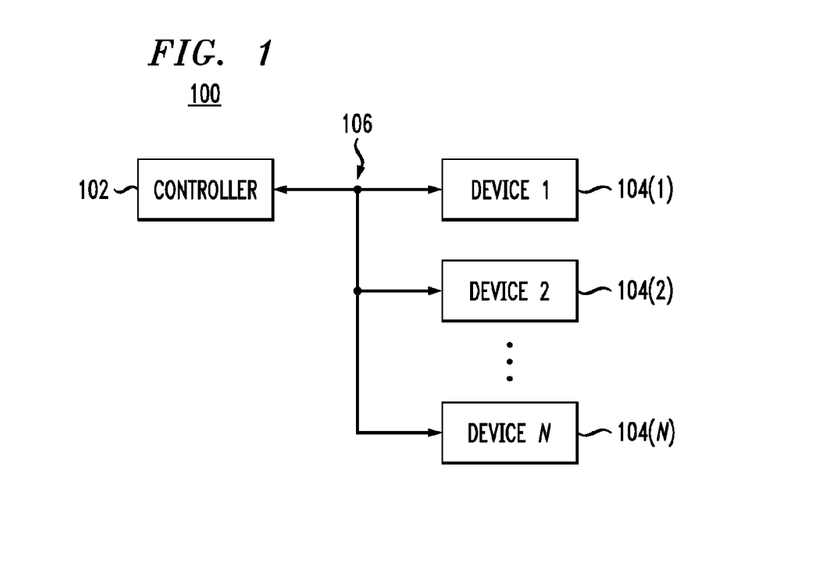
FIG. 1 shows a block diagram of a system having a plurality of devices coupled to a bidirectional communications bus, in accordance with illustrative embodiments.

FIG. 1 shows a block diagram of system 100 having controller 102 coupled to a plurality of devices, shown as devices 104(1)-104(N), via shared communication bus 106. As shown, shared communication bus 106 might be implemented as a bidirectional bus. Each of devices 104(1)-104(N) and controller 102 is desirably assigned a unique address such that commands and data can be broadcast over shared communication bus 106, but only processed by one or more intended recipient devices independently from all of devices 104(1)-104(N) and controller 102, where N is a positive integer. In various embodiments, devices 104(1)-104(N) might be implemented as separate individual devices (e.g., in an automotive application, a brake sensor, a gear sensor, a motor sensor, etc.), separate integrated circuits (e.g., a processor, a memory, a sensor, etc.), separate silicon die located in a single integrated circuit (e.g., separate die of a system-on-chip (SoC), etc,), or separate elements of a single silicon die (e.g., separately addressable memories on a single die, etc.). In some embodiments, controller 102 might serve as a master device while devices 104(1)-104(N) serve as slave devices on shared communication bus 106 (e.g., in an automotive application, controller 102 might be an Electronic/Engine Control Unit (ECU) or the Engine Control Module (ECM), etc.).

Communication bus 106 might be a bidirectional serial bus. For example, communications bus 106 might be implemented as one of an Inter-Integrated Circuit ("I²C") bus or a Local Interconnect Network ("LIN") bus. Some embodiments might employ a bus communicating in accordance with a Single Edge Nibble Transmission (SENT) protocol. Thus, system 100 might typically be implemented for automotive applications as a bidirectional serial bus coupling one or more devices 104, such as sensors, to an ECU or ECM 102, where the devices 104 are assigned unique addresses to allow for communication to selected ones of the devices over the commonly shared communication bus 106.

Some embodiments employ the SENT protocol to communicate over bus 106. Such embodiments employ a "bussable" version of SENT, meaning that the protocol is capable of being employed on a communications bus shared by multiple devices where communication with one or more individual ones of the multiple devices can be achieved via shared data line(s). Such implementations of SENT include those described in U.S. Pat. No. 8,577,634 issued Nov. 5, 2013, and U.S. patent application Ser. Nos. 14/182,595 filed Feb. 18, 2015, Ser. No. 14/645,946 filed Mar. 12, 2015, and Ser. No. 14/645,957 filed Mar. 12, 2015, all of which have the same assignee as the present application and the teachings of which are incorporated by reference herein in their entireties.

Figure 2:
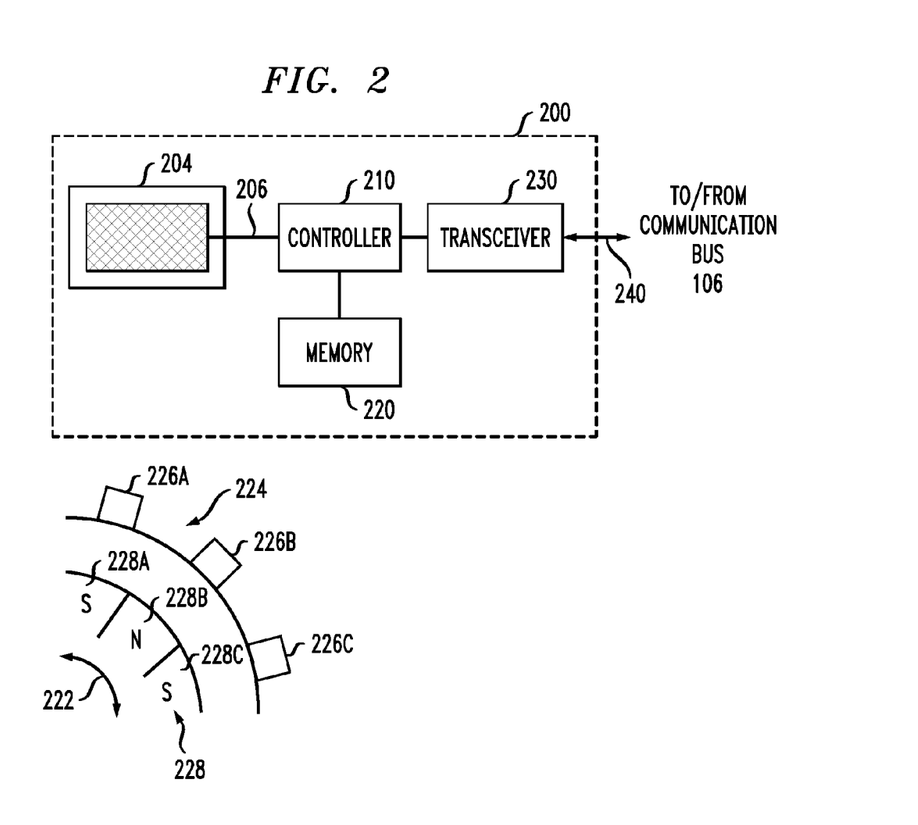
FIG. 2 shows a block diagram of a magnetic field sensor of the system shown in FIG. 1.

FIG. 2 shows an illustrative application of system 100. As shown in FIG. 2, one or more of devices 104(1)-104(N) might be implemented as a magnetic field sensor 200. Alternatively, a given one of devices 104(1)-104(N) might include at least one magnetic field sensor 200. Magnetic field sensor 200 includes magnetic field sensing element 204 that senses one or more parameters of a magnetic field in response to the presence or movement of a ferromagnetic or magnetic object (shown as object 224 in FIG. 2).

As used herein, the term "magnetic field sensing element" is used to describe a variety of electronic elements that can sense a magnetic field. Magnetic field sensing element 204 can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR, etc.) and vertical. Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a linear magnetic field sensor that senses a magnetic field density of a magnetic field.

As shown in FIG. 2, magnetic field sensor 200 might be a linear magnetic field sensor to detect the magnitude of a magnetic field. The magnetic field magnitude might be measured as a flux density of the magnetic field. In an embodiment, magnetic field sensing element 204 generates a magnetic field signal 206 that is proportional to changes in magnetic field magnitude and, thus, can be used to detect field strength or magnitude and/or motion or position of an object. The magnetic field might be generated by the object 224 itself in the case of a magnetic object. Alternatively, the magnetic field might be generated by a magnet, such as by a ring magnet 228 having polarized magnetic regions north (N) and south (S) 228A-228C, and the sensed magnetic field is indicative of movement (such as rotation in a direction shown by arrow 222) of the ferromagnetic object 224 having features 226A-226C.

In addition to one or more magnetic field sensing elements 204, magnetic field sensor 200 includes controller 210 and a transceiver 230 that generates output signals for transmission on bus 106 and receives signals from bus 106. In some embodiments, controller 210 has an analog portion to process output signals of magnetic field sensing elements 204, such as with amplification, gain control, offset adjustment and analog-to-digital signal conversion. A digital portion of controller 210 might include filtering, temperature compensation, and linearization functions as examples. In an embodiment, controller 210 may include elements and operate in a manner described generally in co-pending U.S. patent application Ser. No. 14/541,735, filed on Nov. 14, 2014, entitled Magnetic Field Sensor Having Calibration Circuitry And Techniques, which is assigned to the Assignee of the subject application and the teachings of which are incorporated herein by reference in their entirety.

To generate output signals, transceiver 230 might process one or more controller output signals to provide output 240 for communication to one or more other devices for further processing via shared communication bus 106 of FIG. 1. Transceiver 230 might include, for example, an output driver, electrostatic discharge protection circuitry, and/or current limit circuitry. The output 240 might be provided in various forms, such as a voltage signal or a current signal in the case of a two-wire or two-terminal device. Transceiver 230 also receives data from communication bus 106 for coupling to controller 210, and memory 220 might store various settings.

Other embodiments of magnetic field sensor 200 might generally operate as described in greater detail in U.S. Pat. No. 8,773,123, issued on Jul. 8, 2014, entitled "Two-Terminal Linear Sensor" which is assigned to the Assignee of the subject application and the teachings of which are incorporated herein by reference in their entirety.

While a linear sensor 200 is illustrated in FIG. 2, it will be appreciated that concepts and techniques described herein can be applied to any type of magnetic field sensor. As examples, the magnetic field sensor may take the form of a magnetic switch, a current sensor, a proximity detector, a rotation detector, and/or an angle sensor. The sensed magnetic field parameter might be magnetic field density in the case of a linear magnetic field sensor (e.g., sensor 200), although other magnetic field parameters might alternatively or additionally be. sensed. For example, the magnetic field polarity might be sensed and in the case of an angle sensor, the magnetic field angle might be sensed. It will be appreciated that magnetic field sensor 200 might sense one or more parameters of an applied magnetic field.

Figure 3:
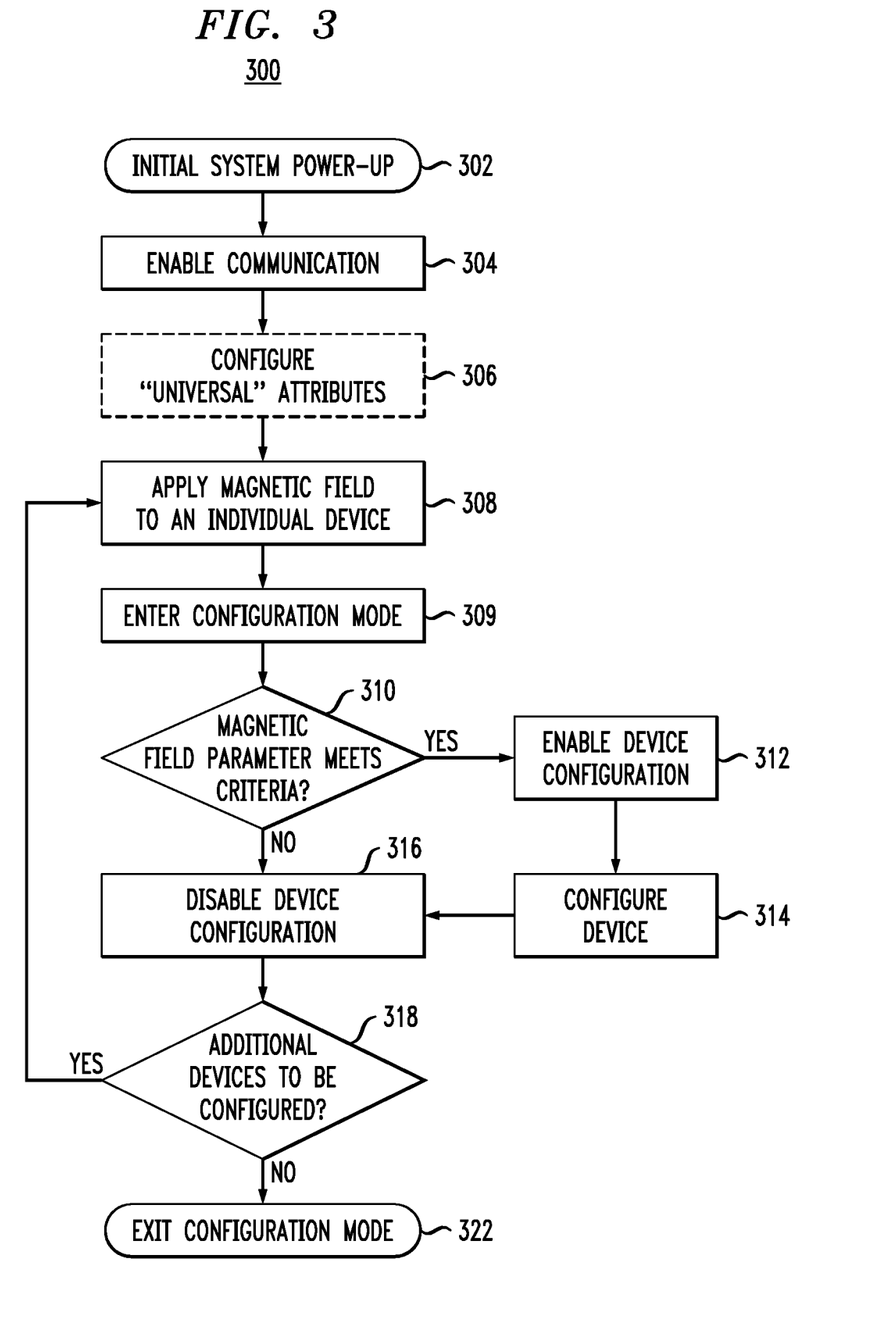
FIG. 3 shows a flow diagram of a configuration process of the system shown in FIG. 1.

As described, each device coupled to shared communication bus 106 is desirably assigned a unique address to facilitate communication between devices on the bus. FIG. 3 shows a flow diagram of process 300 for assigning unique addresses to individual devices coupled to shared communication bus 106. More generally, process 300 can be used to configure a device with various settings, such as a unique address.

At processing block 302, process 300 starts, for example during an initial power-up of system 100. At processing block 304, system 100 enables communication on communication bus 106, for example upon controller 102 transmitting a command or message (such as an access code) over shared communication bus 106 to some or all of devices 104(1)-104(N). Such a command might or might not be acknowledged by devices 104(1)-104(N), based on the communication protocol employed by bus 106, In some embodiments, each of devices 104(1)-104(N) might desirably send an acknowledgment message to controller 102 such that controller 102 can determine a number of devices that are coupled to bus 106 (e.g. determine the value of IV). In some embodiments, the broadcast command to enable communication might be sent to a default address of devices 104 (e.g., address 0). Thus, in some embodiments, only ones of devices 104 that have yet to be programmed with a unique address (or fail to be programmed with a unique address) would receive, process and respond to the broadcast command to enable communication. Thus, some embodiments might be able to detect if a given one of devices 104 could not be programmed with a unique address, and indicate an error code for further analysis. In other embodiments, all devices 104, whether having been programmed with a unique address or not, receive, process and respond to the broadcast command to enable communication.

At optional processing block 306, various configurable attributes that are universal across all of devices 104(1)-104(N) are set by controller 102 sending one or more broadcast commands over shared communication bus 106. Such commands might or might not be acknowledged by devices 104(1)-104(N), based on the communication protocol employed by bus 106, For example, if devices 104(1)-104(N) are magnetic field sensors such as shown in FIG. 2, at processing block, 306, sensitivity for magnetic field sensing might be set or calibrated.

At processing block 308, a magnetic field is applied to a particular one of devices 104(1)-104(N) to configure one or more settings of the device, such as to have a unique address assigned. For example, a magnet having a known field strength or magnitude might be placed in proximity to the particular one of devices 104(1)-104(N), where the field strength or magnitude is sufficient to be detected by magnetic field sensing element 204.

At processing block 309, system 100 requests that one of devices 104(1)-104(N) enter a configuration mode. For example, controller 102 might again transmit a con over shared communication bus 106 to some or all of devices 104(1)-104(N). However, only the particular one of devices 104(1)-104(N) to which a magnetic field was applied at block 308 will be enabled to process and/or respond to the received configuration mode command. The configuration mode command might be transmitted using the same or different protocol as used to send the enable communication command at block 304. For example, the enable communication command transmitted at block 304 might conform to a SENT protocol, while the enable communication command might be Manchester encoded or conform to another protocol.

At processing block 310, magnetic field sensing element 200 for each of devices 104(1)-104(N) determines whether the sensed magnetic field parameter meets predetermined criteria. For example, the sensed magnetic field parameter might be compared predetermined criteria set during optional processing block 306. For example, the sensed magnetic field parameter might include a magnitude of the magnetic field, a polarity or direction of the magnetic field, or an angle of the magnetic field (if magnetic field sensor 200 is an angle sensor). The sensed magnetic field parameter is compared to predetermined criteria, and the predetermined criteria might have been set by controller 210. As one example, the sensed magnetic field parameter might be magnetic field magnitude and the predetermined criteria might be a minimum or maximum threshold level to which the sensed magnetic field magnitude is compared. Alternatively, the predetermined criteria might be a positive or negative polarity in the case of a sensed magnetic field polarity, or a particular magnetic field angle or range of angles in the case of a sensed magnetic field angle. It will be appreciated that the predetermined criteria might further include more than one such individual criteria (e.g., the predetermined criteria might be both a threshold magnetic field magnitude and a particular polarity).

If, at processing block 310, the sensed magnetic field parameter meets criteria, then at processing block 312, the corresponding device is enabled for configuration (e.g., the address of a given one of devices 104 will be configured at processing block 314). The device configuration might be based on one or more commands that are sent from controller 102 on bus 106 to update configurable operating attributes or settings of the corresponding one of devices 104 to which the magnetic field was applied. For example, controller 102 might assign a unique address to the corresponding one of devices 104 such that it can be uniquely identified on bus 106. For example, the assigned address might be stored in memory 220, which might be a read-only memory (ROM), electrically erasable programmable read-only memory (EEPROM), one-time programmable (OTP) memory, or any other static memory such that the data remains stored if device 104 is unpowered. Alternatively, the configuration might be based on internal values or settings stored in memory 220 or otherwise established.

At processing block 316, configuration of the particular one of devices 104 is complete, and the particular one of devices 104 can exit its configuration mode or can be sent a command by controller 102 to exit its configuration mode. Since the corresponding one of devices 104 now has a unique address, configuration commands broadcast to a default bus address (e.g., address 0) might no longer be received and processed by the programmed one(s) of devices 104. Process 300 continues to processing block 318.

If, at processing block 310, the sensed magnetic field parameter does not meet the predetermined criteria, then at processing block 316, magnetic field sensor 200 is disabled for configuration (e.g., the given one of devices 104 will not change its configuration). Thus, devices 104 to which a magnetic field meeting the predetermined criteria was not applied at processing block 308 correspondingly do not sense a magnetic field parameter meeting the predetermined criteria, and do not undergo configuration during processing block 314. Process 300 continues to processing block 318.

At processing block 318, if controller 102 determines that additional devices 104 remain to be configured, process 300 returns to processing block 308. For example, in one embodiment, controller 102 might resend a broadcast command to the default address (e.g., address 0) and determine if any of devices 104 respond. If no devices respond, then all of devices 104 might be presumed to have been assigned a unique address since none of devices 104 processed and responded to a command that was addressed to the default address. In alternative embodiments, a user or installer of system 100 might provide an input to controller 102 via a user interface (not shown) coupled to controller 102. The user input might cause controller 102 to enter or exit configuration mode for devices 104. At processing block 308, the magnetic field is applied to a next one of devices 104, for example by moving the magnet proximate to another one of devices 104, and process 300 proceeds to processing block 310 to detect which one of devices 104 is activated (e.g., has an applied magnetic field meeting the predetermined criteria) for configuration by controller 102.

If, at processing block 318, controller 102 determines that none of devices 104 remain to be configured (or controller 102 receives a user input to exit configuration mode), then at processing block 322, process 300 completes. For example, at processing block 322, controller 102 might broadcast a command to one or more of devices 104 to exit configuration mode, or controller 102 might send multiple commands (e.g., a command to each unique address, and/or the default address) to corresponding ones of devices 104 to exit configuration mode. Alternatively, controller 102 might reset power to one or more of devices 104 such that the reset ones of devices 104 exit the configuration mode.

Figure 4:
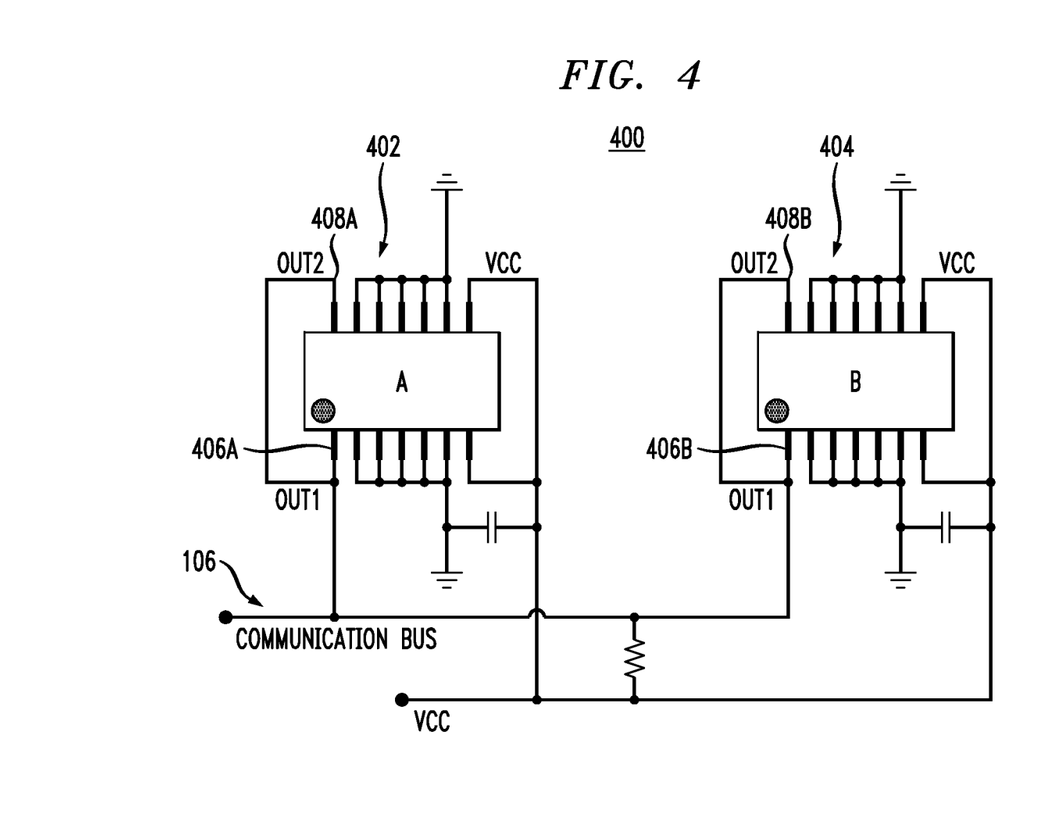
FIG. 4 shows a block diagram of an embodiment of the system shown in FIG. 1 employing the magnetic field sensor shown in FIG. 2 and the process shown in FIG. 3.

FIG. 4 shows a block diagram of an embodiment of system 100 employing magnetic field sensor 200 and process 300. As shown in FIG. 4, system 400 has two integrated circuits (ICs), 402 and 404, coupled to shared communication bus 106. In the embodiment shown in FIG. 4, each IC 402 and 404 has two electrically isolated magnetic field sensors (e.g., magnetic field sensor 200 shown in FIG. 2). In some embodiments, each magnetic field sensor might be implemented on a separate die of each of ICs 402 and 404. Such an implementation having separate die within a single IC might be desirable, for example, for redundancy and fail-safe operation in safety critical automotive applications. Thus, as shown in the illustrative embodiment shown in FIG. 4, IC 402 has a first output 406A and a second output 408A (e.g., an output from the first die and an output from the second die) coupled to communication bus 106. Similarly, IC 404 has a first output 406B and a second output 408B (e.g., an output from the first die and an output from the second die) coupled to communication bus 106. Communication bus 106 might also be tied to inputs to each die of each IC (not shown in FIG. 4). As shown in FIG. 4, the outputs 406A and 408A might be coupled together to provide redundancy for IC 402 (e.g., if one of the magnetic field sensor die fails, the output of the other magnetic field sensor die should make the failure transparent to devices coupled to communication bus 106). Similarly, outputs 406B and 40813 might be coupled together to communication bus 106 to provide redundancy for IC 404.

As described herein, ICs 402 and 404 might be manufactured having a default address for each die. In some implementations, ICs 402 and 404 might then be manufactured into various devices (e.g., devices 104), while still having the default addresses. Thus, described embodiments employ process 300 of FIG. 3 to configure each sensor die after the IC is assembled in a product and coupled to a shared bus (e.g., as one of many sensor modules coupled to a shared bus in an automobile). As described in regard to FIG. 3, an external magnetic field is applied as an input to a given IC. A message is broadcast to multiple sensor ICs on the shared bus, and only the IC where the magnetic input has met a predetermined or preset criteria responds to the broadcast message, such that that IC (or individual die on that IC) can be programmed configured (e.g., programmed with a unique bus address).

As shown in FIG. 4, each IC 402 and 404 has two die (e.g., die 1 and die 2), and each die has a corresponding output (e.g., out1 406 and out2 408, respectively). As described in regard to FIG. 3, a special instruction (e.g., configuration command) is communicated to the ICs on the shared bus. Only the IC (or ICs) sensing a magnetic field parameter that meets a certain criteria (e.g., a magnetic field meeting or exceeding a predetermined threshold) is enabled into configuration mode on the shared bus. In the configuration mode, one or more settings might be configured, such as a unique address being written to the enabled sensor IC.

For the specific example shown in FIG. 4, initially die 1 of IC 402 and die 1 of IC 404 might have a default bus address of 0, while die 2 of IC 402 and die 2 of IC 404 might have a default bus address of 1. The controller sends the configuration mode instruction to all ICs with an address of 0. If a magnetic field were applied to IC 404, only die 1 of IC 404 would enter configuration mode and respond to and process subsequent instructions from the controller. Thus, as one example, the controller can set a unique address for die 1 of IC 404. The process is continued for all die having a default bus address of 1, and so on. The magnetic field might also be applied to each of the ICs coupled to the shared bus (e.g., IC 402 of FIG. 4), and the process repeated until each die of each IC coupled to the bus has been assigned a unique address. In some embodiments, additional configurable operating parameters might also be set for each die and/or IC in addition to a unique address.

For the embodiment shown in FIG. 4, all sensors coupled to communication bus 106 are powered with a typical IC power-on sequence (e.g., step 302 of FIG. 3). The configuration mode command is transmitted to all or some of the ICs coupled to the bus (e.g., step 304 of FIG. 3). Optionally, the controller might adjust programmable settings, such as sensor sensitivity, of all ICs on the bus (e.g., optional step 306 of FIG. 3). For example, a write command is sent to a configuration register (e.g., memory 220) of one or more ICs. The data stored in the register might typically include a 12-bit threshold value, a polarity bit, and an enable bit. The threshold value is the used to determine if the sensed magnetic field parameter has met the threshold criteria or value (e.g., a minimum field magnitude). The polarity bit is used to determine if the sensed magnetic field polarity has met a predetermined polarity condition. When the enable bit is set, the device is enabled to compare the sensed magnetic field parameter(s), such as field magnitude and polarity, to the respective predetermined criteria.

In configuration mode, commands might be addressed to all die having a default bus address of 0 (e.g., step 304 of FIG. 3). In the example shown in FIG. 4, two die coupled to the bus would have a default address of 0: die 1 of IC 402 and die 1 of IC 404. If a magnetic field is applied to, for example, IC 404, then configuration access is enabled on only a single sensor die, die 1 of IC 404 (e.g., step 312 of FIG.). A write command is sent to die 1 of IC 404 to write a unique bus address to static memory (e.g., EEPROM, etc.) (e.g., step 314 of FIG. 3). After the write command, die 1 of IC 404 responds when addressed with this newly configured bus address. Once a given die is programmed with a unique address, configuration mode might be exited, additional devices might be programmed, or all the devices might be power cycled and restarted. (e.g., steps 316 322 of FIG. 3). The process is repeated to configure all the individual die coupled to the shared bus until each die is programmed with a unique bus address.

Thus, the described embodiments, provide a flexible platform to configure devices coupled to a shared bus without the use of additional external pins or components and without necessitating manufacturing multiple versions of the same device with specially programmed settings.

As used herein, the term "predetermined," when referring to a value, signal, threshold or criteria, is used to refer to something that is set, or fixed. In embodiments, the predetermined value, signal, threshold or criteria is set in the factory at the time of manufacture, or by external means, e.g., programming, thereafter. As used herein, the term "determined," when referring to a value or signal, is used to refer to a value or signal that is identified by a circuit during operation, after manufacture.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances, In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc these terms are merely intended to assist in describing the embodiments and are not intended to limit the claims in any way. Such terms, do not require exactness (e.g., exact perpendicularity or exact parallelism, etc,), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

While the embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, hard drives (HDDs), floppy diskettes, magnetic tape media, optical recording media, compact discs (CDs), digital versatile discs (DVDs), solid state drives (SSDs), solid state memory, hybrid magnetic and solid state memory, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a processing device, the program code segments combine with the processor to provide a unique device that operates analogously to specific logic circuits. Such processing devices might include, for example, a general purpose microprocessor, a digital signal processor (DSP), a reduced instruction set computer (RISC), a complex instruction set computer (CISC), an application specific integrated circuit (ASIC), a field programmable gate array (FPGA), programmable logic array (PLA), a microcontroller, an embedded controller, a multi-core processor, and/or others, including combinations of the above. Described embodiments might also be implemented in the form of a bitstream or other sequence of signal values electrically or optically transmitted through a medium, stored magnetic-field variations in a magnetic recording medium, etc., generated using a method and/or an apparatus as recited in the claims.

It should be understood that the steps of the methods set forth herein are not necessarily required to be performed in the order described, and the order of the steps of such methods should be understood to be merely illustrative. Likewise, additional steps may be included in such methods, and certain steps may be omitted or combined, in methods consistent with various embodiments.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts that have been described and illustrated herein might be made by those skilled in the art without departing from the scope of the following claims.

We claim:

1. A device configured to be coupled to a shared bus, the device comprising:
a magnetic field sensing element configured to sense a magnetic field;
wherein, upon receiving a configuration command over the shared bus, the device is configured to:
determine whether a parameter of the sensed magnetic field meets predetermined criteria; and
if the parameter of the sensed magnetic field meets the predetermined criteria, the device is configured to respond to the configuration command by applying one or more configuration settings;
otherwise, if the parameter of the sensed magnetic field does not meet the predetermined criteria, the device is configured to ignore the configuration command.

2. The device of claim 1, wherein the device is further configured to receive the one or more configuration settings over the shared bus.

3. The device of claim 2, further comprising a memory configured to store the one or more configuration settings.

4. The device of claim 1, wherein the magnetic field is applied by a magnet.

5. The device of claim 1, wherein the device comprises a plurality of separately addressable sub-modules, and wherein the device is configured to independently apply configuration settings to each of the plurality of separately addressable sub-modules.

6. The device of claim 5, wherein the device comprises an integrated circuit, and each of the separately addressable sub-modules comprises a silicon die.

7. The device of claim 5, wherein the device comprises a magnetic field sensor integrated circuit.

8. The device of claim 1, wherein the magnetic field sensing element comprises at least one of a Hall effect element, a magnetoresistance element, and a magnetotransistor.

9. The device of claim 1, wherein the parameter of the sensed magnetic field comprises at least one of a magnetic field magnitude, a magnetic field polarity, and a magnetic field angle.

10. The device of claim 1, wherein the one or more configuration settings comprise a unique bus address.

11. The device of claim 1, wherein the device is further configured to reset after applying the one or more configuration settings.

12. The device of claim 1, wherein the shared bus comprises one of an Inter-Integrated Circuit ($I^2C$) bus, a Serial Peripheral interface (SPI) bus, a Single Edge Nibble Transmission (SENT) bus, a bus employing Manchester encoding, and a Local Interconnect Network (LIN) bus.

13. A method of configuring each of a plurality of devices coupled to a shared bus, the method comprising:
receiving a configuration command over the shared bus;
determining, by a magnetic field sensing element of each of the plurality of devices, whether a parameter of a sensed magnetic field meets predetermined criteria;
applying, by each of the plurality of devices having a parameter of the sensed magnetic field meeting the predetermined criteria, one or more configuration settings; and
ignoring the configuration command by each of the plurality of devices that do not have a parameter of the sensed magnetic field that meets the predetermined criteria.

14. The method of claim 13, further comprising:
receiving, each of the responding ones of the plurality of devices, one or more configuration settings.

15. The method of claim 14, further comprising:
storing the received one or more configuration settings in a memory.

16. The method of claim 13, further comprising:
before the step of determining, applying, by a magnet, a magnetic field to a given one of the plurality of devices.

17. The method of claim 16, further comprising:
iteratively applying the magnetic field to each of the plurality of devices until each of the plurality of devices has been configured.

18. The method of claim 16, wherein one or more of the plurality of devices comprise a plurality of separately addressable sub-modules, the method further comprising:
iteratively resending the configuration command over the shared bus until each of the plurality of separately addressable sub-modules of each of the responding ones of the plurality of devices has been configured.

19. The method of claim 18, wherein each of the plurality of devices comprises an integrated circuit, and each of the separately addressable sub-modules comprises a silicon die.

20. The method of claim 18, wherein each of the plurality of devices comprises a magnetic field sensor integrated circuit.

21. The method of claim 13, wherein the magnetic field sensing element comprises at least one of a Hall effect element, a magnetoresistance element, and a magnetotransistor.

22. The method of claim 13, wherein the parameter of the sensed magnetic field comprises at least one of a magnetic field magnitude, a magnetic field polarity, and a magnetic field angle, the method further comprising:
comparing the sensed parameter to the predetermined criteria.

23. The method of claim. 13, wherein the one or more configuration settings comprise a unique bus address.

24. The method of claim 13, further comprising:
resetting given ones of the plurality of devices by at least one of:
sending a reset command over the shared bus to reset given ones of the plurality of devices; and
performing a power cycle to reset given ones of the plurality of devices.

25. The method of claim 13, wherein the shared bus comprises one of an Inter-Integrated Circuit (I²C) bus, a Serial Peripheral Interface (SPI) bus, a Single Edge Nibble Transmission (SENT) bus, a bus employing Manchester encoding, and a Local Interconnect Network (LIN) bus.

26. A system comprising:
a master and a plurality of devices each coupled to a shared bus, wherein:
the master is configured to send a configuration command over the shared bus; and
each of the plurality of devices are configured to determine whether a parameter of a sensed magnetic field meets predetermined criteria, wherein each of the plurality of devices having a parameter of the sensed magnetic field value meeting the predetermined criteria are configured to respond to the configuration command by applying one or more configuration settings, and each of the plurality of devices not having a parameter of the sensed magnetic field meeting the predetermined criteria are configured to ignore the configuration command.

27. The system of claim 26, wherein the master is configured to send the one or more configuration settings over the shared bus.

28. The system of claim 26, wherein the magnetic field is applied to a given one of the plurality of devices by a magnet, and the magnetic field is iteratively applied to each of the plurality of devices until each of the plurality of devices has been configured.

29. The system of claim 28, wherein one or more of the plurality of devices comprise a plurality of separately addressable sub-modules, and the master is configured to iteratively resend the configuration command over the shared bus until each of the plurality of separately addressable sub-modules of each of the responding ones of the plurality of devices has been configured.

30. The system of claim 29, wherein each of the plurality of devices comprises an integrated circuit, and each of the separately addressable sub-modules comprises a silicon die.

31. The system of claim 29, wherein each of the plurality of devices comprises a magnetic field sensor integrated circuit.

32. The system of claim 31, wherein the magnetic field sensing element comprises at least one of a Hall effect element, a magnetoresistance element, and a magnetotransistor.

33. The system of claim 26, wherein:
the parameter of the sensed magnetic field comprises at least one of a magnetic field magnitude, a magnetic field polarity, and a magnetic field angle; and
each of the plurality of devices is configured to compare the sensed parameter to the predetermined criteria.

34. The system of claim 26, wherein the one or more configuration settings comprise a unique bus address.

35. The system of claim 26, wherein the master is configured to reset given ones of the plurality of devices by at least one of:
sending a reset command over the shared bus to given ones of the plurality of devices; and
power cycling given ones of the plurality of devices.

36. The system of claim 26, wherein the shared bus comprises one of an Inter-Integrated Circuit (I²C) bus, a Serial Peripheral Interface (SPI) bus, a Single Edge Nibble Transmission (SENT) bus, a bus employing Manchester encoding, and a Local Interconnect Network (LIN) bus.

* * * * *

UNITED STATES PATENT AND TRADEMARK OFFICE
CERTIFICATE OF CORRECTION

| | | |
|---|---|---|
| PATENT NO. | : 9,852,094 B2 | Page 1 of 2 |
| APPLICATION NO. | : 14/960654 | |
| DATED | : December 26, 2017 | |
| INVENTOR(S) | : Jesse Lapomardo et al. | |

It is certified that error appears in the above-identified patent and that said Letters Patent is hereby corrected as shown below:

In the Specification

Column 2, Line 27, delete "form. that" and replace with --form that--

Column 2, Line 51, delete "sub modules," and replace with --sub-modules,--

Column 3, Line 4, delete "(I2C)" and replace with --($I^2C$)--

Column 3, Line 5, delete "(SFr)" and replace with --(SPI)--

Column 3, Line 58, "(I2C)" and replace with --($I^2C$)--

Column 4, Line 41, delete "(I2C)" and replace with --($I^2C$)--

Column 4, Line 43, delete "Local. Inter-" and replace with --Local Inter- --

Column 5, Line 39, delete "communications" and replace with --communication--

Column 5, Line 66, delete "200," and replace with --200.--

Column 7, Line 11, delete "elements" and replace with --element--

Column 7, Line 50, delete "be. sensed" and replace with --be sensed--

Column 8, Line 4, delete "106," and replace with --106.--

Column 8, Line 8, delete "IV)." and replace with --N).--

Column 8, Line 28, delete "106," and replace with --106.--

Signed and Sealed this
Tenth Day of July, 2018

Andrei Iancu
*Director of the United States Patent and Trademark Office*

CERTIFICATE OF CORRECTION (continued)
U.S. Pat. No. 9,852,094 B2

Column 8, Line 30, delete "block, 306," and replace with --block 306,--

Column 8, Line 42, delete "con" and replace with --command--

Column 9, Line 1, delete "magnetic" and replace with --a magnetic--

Column 10, Line 41, delete "40813" and replace with --408B--

Column 10, Line 60, delete "each. die" and replace with --each die--

Column 11, Line 31, delete "is the used" and replace with --is used--

Column 11, Line 53, delete "restarted. (e.g.," and replace with --restarted (e.g.,--

Column 12, Line 36, delete "etc these" and replace with --etc.), these--

Column 13, Lines 29-30, delete "(FPGA), programmable" and replace with --(FPGA), a programmable--